April 14, 1953     C. WOOLF ET AL     2,635,117
PREPARATION OF POLYCHLOROACETONES
Filed May 12, 1949
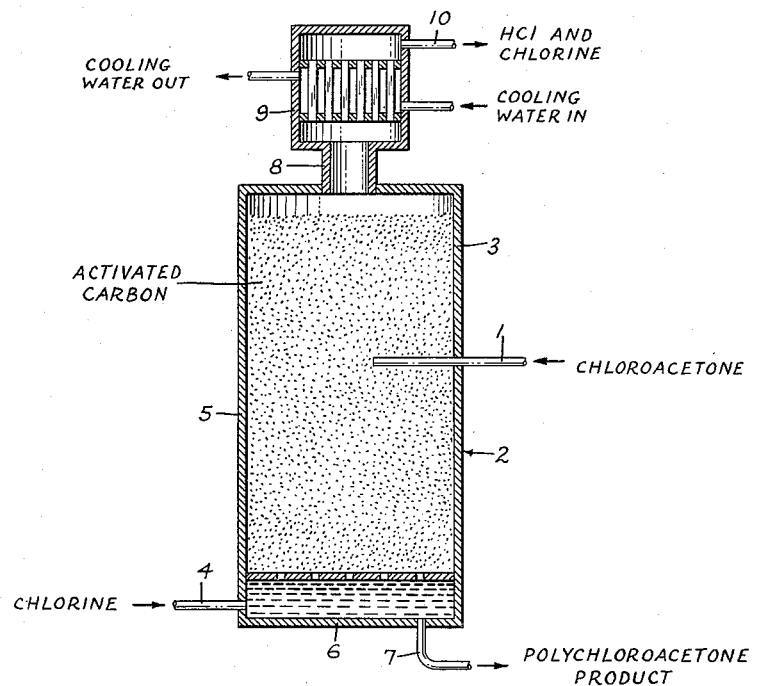
INVENTORS.
CYRIL WOOLF
EVERETT E. GILBERT
BY
*Max Geldin*
ATTORNEY.

Patented Apr. 14, 1953

2,635,117

UNITED STATES PATENT OFFICE 2,635,117

PREPARATION OF POLYCHLOROACETONES

Cyril Woolf, Long Island City, and Everett E. Gilbert, New York, N. Y., assignors to Allied Chemical & Dye Corporation, New York, N. Y., a corporation of New York Application May 12, 1949, Serial No. 92,772

4 Claims. (Cl. 260—593)

This invention relates to the preparation of polychloroacetones and is particularly concerned with the conversion trichloroacetone to polychloroacetones such as hexachloroacetone.

It has been known to prepare polychloroacetones by chlorinating acetone, monochloroacetone and isopropyl alcohol. However, such methods of preparing higher chloroacetones suffer from the defects that they are slow and time consuming and, particularly with respect to preparation of hexachloroacetone, the application of actinic radiation or pressure is additionally necessary, the latter requiring the use of pressure vessels which are expensive and difficult to operate because of their susceptibility to attack by chlorine and HCl.

One object of the invention is to prepare polychloroacetones. Another object of the invention is to produce hexachloroacetone and pentachloroacetone in high yields by chlorination of a trichloroacetone. A further aim of the invention is to provide processes for the chlorination of trichloroacetones to hexachloroacetone in high yields and under economical operating conditions. Yet another object of the invention is the provision of smoothly operating continuous chlorination processes for production of such polychloroacetones. Other objects and advantages will appear hereinafter.

In accordance with the invention we have found that trichloroacetones may be smoothly and rapidly chlorinated to polychloroacetones of from 5 to 6 chlorine atoms in high yields by subjecting the organic starting material to the action of chlorine in the presence of activated carbon as catalyst. The pentachloroacetone and hexachloroacetone products of the invention are of importance as chemical intermediates in the production of fluorine derivatives, insecticides and weed killers, and have been heretofore difficult to prepare by known methods of chlorination.

The figure of the accompanying drawing is a cross-sectional view of a reactor which may be used in carrying out the process of the invention.

Various alternative procedures may be employed in practicing the instant process. In the preferred method of operation utilizing the apparatus illustrated, a trichloroacetone or isomeric mixture thereof is introduced through inlet 1 into a vertical reactor 2, packed with activated carbon, inlet 1 being positioned about midway down reactor side wall 3, while introducing chlorine through inlet 4 in the lower portion of the opposite side wall 5 near base 6 of the reactor. Reaction temperature is maintained below the boiling point of the desired polychloroacetone product, e. g. hexachloroacetone, but above the boiling point of the organic reactant, i. e. trichloroacetone. The liquid polychloroacetone product flows downwardly through the reactor countercurrent to the chlorine gas stream and is continuously removed through outlet 7 positioned in base 6 of the reactor opposite chlorine inlet 4. HCl gas formed in the reaction and residual chlorine pass through pipe 8 in the top of the reactor and are then cooled by passage through reflux condenser 9, such gases finally exiting through outlet 10 of the reflux condenser.

A further method of carrying out the invention involves introduction of the organic reactant in the form of a liquid countercurrently to or concurrently with a stream of gaseous chlorine in a vertical reactor packed with activated carbon and optionally provided with a reflux condenser. Reaction temperature is maintained below the boiling points of the organic reactant and product, and the polychloroacetone product is thus collected in liquid form. The same reactor as shown may be employed under these operating conditions.

In all of the above-noted methods for carrying out the process of the invention the extent and velocity of chlorination may be controlled by variations in reaction temperature, relative ratio of reactants and rate of throughput thereof.

The organic starting materials in our process are 1,1,3-trichloroacetone or 1,1,1-trichloroacetone or mixtures thereof. The organic reactants may be introduced into the reaction zone either in the liquid or vapor state.

Best results in accordance with the invention are obtained by using excess chlorine in the reaction. However, we have found that smoother and more rapid operation productive of high yields and low by-product formation is achieved in accordance with our process by employing in the neighborhood of twice the theoretical chlorine required. Thus, in the chlorination of 1,1,3-trichloroacetone to hexachloroacetone in accordance with the equation

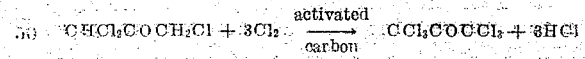

while 3 mols of chlorine are theoretically required per mol of trichloroacetone, we prefer to employ from about 5 to 7 mols of chlorine per mol of trichloroacetone. The chlorine is usually introduced into the bottom of the reactor and flows upwardly either countercurrently to or concurrently with the organic reactant.

Any commercial form of activated carbon may be employed as catalyst. The reactor is generally filled to a considerable depth with a bed of such activated carbon particles or powder. However, the activated carbon catalyst particles may be suspended in liquid trichloracetone present in the reaction zone. The amount of catalyst employed may vary widely, sufficient catalyst being utilized to obtain the desired polychlorinated product in good yields commensurate with high rate of throughput of reactants as the particular temperature of reaction. Our experience shows that the activated carbon catalyst has a sufficiently long life to produce as much as 100 times or more its weight of hexachloroacetone from trichloroacetone. The activated carbon should be dried in vacuum before use; otherwise, side reactions increase and the product may become dark in color. In starting a run the activated carbon should preferably first be saturated with chlorine and the catalyst bed cooled to room temperature before the organic reactant is commenced to be slowly introduced, after which temperature is brought up to the normal operating value.

In the preparation of the main product of the invention, hexachloroacetone, temperatures of 100°–200° C. are ordinarily utilized with temperatures of 140°–170° C. and particularly 150°–160° C. producing most desirable results. In the production of hexachloroacetone using trichloroacetones as starting material, if reaction temperature is raised beyond 200° C. the amount of high boiling by-product increases.

In commencing operation in accordance with the preferred mode of operation outlined above utilizing the packed reactor illustrated as applied particularly to production of hexachloroacetone from trichloroacetones, temperature is kept as low as possible, e. g. around 50° C., during initial introduction of trichloroacetones until liquid product begins to flow from the base of the reactor, after which the temperature may be brought up to the normal operating value. This is to allow for dissipation of heat of absorption and reaction until sufficient free liquid is present in the reactor to provide for temperature control by reflux. If desired the temperature of the exothermic reaction may then be regulated by external cooling means or by such methods as use of a large excess of one of the reactants, e. g. chlorine, or by diluting the reactants with an inert gas, e. g. nitrogen. These temperature control expedients may be employed separately or in any combination. It is noted from the foregoing that reaction temperature may vary so that both the organic reactant and polychloroacetone product are in liquid form or the organic reactant is in the vapor state and the polychloroacetone product is in the liquid state.

The pressure maintained within the reactor is preferably about atmospheric. The chlorine and organic reactants are under sufficient pressure above that in the reactor to enable these materials to be forced into the reaction zone.

Yields of polychloroacetone product produced in accordance with the invention may range as high as 75–85% of theory based on organic reactant starting material. In the preferred mode of operation for production of liquid hexachloroacetone product from trichloroacetones, yields may be increased by removing any vaporized chloracetones from the exit gases of the chlorination reaction and recycling such chloracetones with new trichloroacetone starting material. Such yields may be further increased by removing and recycling the small amount of pentachloroacetone present in the crude hexachloroacetone product produced.

In practice of the preferred embodiments of the invention, the reactor is provided with a reflux condenser for cooling reaction vapors and permitting exit of HCl and excess chlorine from the reactor while returning chloroacetones to the reaction mass. The reactor exit gases are passed through a water scrubber to dissolve HCl and the effluent chlorine may then be dried and recovered.

Materials of construction of the chlorination equipment employed in the instant process include Inconel, Monel metal, stainless steel, glass and silica.

The following detailed examples illustrate the invention, all quantities being expressed in parts by weight:

*Example 1.*—A reactor vessel is packed with a bed of commercial brand of activated carbon. The reactor is provided with a reflux condenser at the top, a chlorine delivery tube extending through the bottom of the reactor into the bottom of the catalyst bed, a feed tube for organic reactants extending within the reactor to about the center of the catalyst bed and a syphon at the base of the reactor for continuous removal of liquid product. The reactor is enclosed by a vertical tubular electric furnace through which air may be blown, if necessary, for cooling. Temperatures of reaction are measured within the activated carbon catalyst bed.

During a period of about 40 hours, 2557 parts of a mixture of 1,1,3-trichloroacetone and 1,1,1-trichloroacetone are continuously introduced through the organic reactant feed tube into the center of the catalyst bed while about 6711 parts of chlorine are introduced during this period into the bottom of the catalyst bed at a constant and continuous rate. Temperature of reaction is maintained at 150°–160° C. Liquid reaction product flows down the reactor countercurrent to the rising chlorine gas stream and is withdrawn from the bottom of the reactor. Exit gases, after cooling by passage through the reflux condenser to return vaporized chloroacetones to the reaction zone, are scrubbed with water to remove HCl and then conveyed to a chlorine recovery system. 3825 parts of liquid reaction product are recovered consisting of about 85% hexachloroacetone, 4% pentachloroacetone, 8% high boiling by-products and 3% dissolved chlorine. The yield of hexachloroacetone based on the trichloroacetone starting mixture is about 78%. At the end of the run the catalyst shows no sign of deterioration.

*Example 2.*—A reactor tower of about 10 cubic feet capacity is packed with activated carbon and provided with temperature recorder, external cooling jacket, reflux condenser, chlorine inlet at the base, organic reactant inlet midway along the tower and exit pipe at the base of the tower for continuous removal of polychloroacetone liquid product.

About 3086 parts of chlorine are fed to the base of the tower at the rate of 129 parts per hour while 1222 parts trichloroacetone are introduced into the middle of the reactor at a rate of 51 parts per hour. The reactants are introduced over a 24 hour period, reaction temperature being maintained at 150°–160° C. with heat of reaction being removed by cooling. About 1841 parts of crude hexachloroacetone reaction product are continuously removed from the bottom of the tower at a rate of about 77 parts per hour while reactor exit gases, comprising principally HCl and free chlorine, after cooling by passage through the reflux condenser, are scrubbed with water to remove HCl, effluent chlorine from the water scrubber being dried and recovered. The crude hexachloroacetone product contains 88% by weight hexachloroacetone, 4% pentachloroacetone, and 8% high boiling by-products. The yield of hexachloroacetone based on trichloroacetone starting material is about 81%.

Since various modifications in the invention may be made without departing from the spirit thereof, the invention is to be taken as limited only by the scope of the appended claims.

We claim:

1. A continuous process of producing hexachloroacetone which comprises introducing a mixture of 1,1,3-trichloroacetone and 1,1,1-trichloroacetone into a reaction zone at a point substantially above the bottom thereof, and introducing excess chlorine into the bottom of said reaction zone, said reaction zone being filled with activated carbon as catalyst at a temperature of 140°–170° C., and continuously withdrawing chiefly hexachloroacetone as product from the bottom of said reaction zone.

2. A continuous process of chlorination which comprises introducing a mixture of 1,1,3-trichloroacetone and 1,1,1-trichloroacetone into about the center of a bed of activated carbon as catalyst contained in a reaction zone while introducing from 5 to 7 mols of chlorine per mol of trichloroacetones into the bottom of said catalyst bed, the temperature in said reaction zone being 150°–160° C., and withdrawing a liquid mixture of hexachloroacetone and pentachloroacetone, predominating in hexachloroacetone, as product from the bottom of said reaction zone.

3. The process of producing a polychloroacetone of from 5 to 6 chlorine atoms which comprises reacting a trichloroacetone with chlorine by introducing said trichloroacetone into a reaction zone at a point substantially above the bottom thereof, said reaction zone being packed with activated carbon as catalyst, and introducing excess chlorine into said reaction zone near the bottom thereof, the temperature of the reaction mixture being 100–200° C., and withdrawing a polychloroacetone containing from 5 to 6 chlorine atoms as product from a point substantially below the level of introduction of said trichloroacetone into said reaction zone.

4. The process as defined in claim 3 wherein said process is continuous and said product consists chiefly of hexachloroacetone and is continuously withdrawn from the bottom of said reaction zone.

CYRIL WOOLF.
EVERETT E. GILBERT.

References Cited in the file of this patent

UNITED STATES PATENTS

| Number | Name | Date |
|---|---|---|
| 2,116,893 | Heisel | May 10, 1938 |
| 2,199,934 | Heisel et al. | May 7, 1940 |
| 2,375,545 | Foster | May 8, 1945 |

FOREIGN PATENTS

| Number | Country | Date |
|---|---|---|
| 638,441 | Germany | Nov. 16, 1936 |

OTHER REFERENCES

Magidson et al., "Chemical Abstracts," vol. 22, pp. 4105–06 (1928).

Groggins, "Unit Processes in Organic Synthesis," 3rd Edition, p. 235, copyright 1947 by McGraw-Hill Book Co., New York.